US009869269B2

(12) United States Patent
Scharp et al.

(10) Patent No.: US 9,869,269 B2
(45) Date of Patent: Jan. 16, 2018

(54) PISTON FOR AN INTERNAL COMBUSTION ENGINE

(71) Applicant: MAHLE INTERNATIONAL GMBH, Stuttgart (DE)

(72) Inventors: Rainer Scharp, Vaihingen (DE); Peter Kemnitz, Leutenbach (DE)

(73) Assignee: Mahle International GmbH (DE)

( * ) Notice: Subject to any disclaimer, the term of this patent is extended or adjusted under 35 U.S.C. 154(b) by 141 days.

(21) Appl. No.: 14/894,902

(22) PCT Filed: May 28, 2014

(86) PCT No.: PCT/DE2014/000264
§ 371 (c)(1),
(2) Date: Nov. 30, 2015

(87) PCT Pub. No.: WO2014/190963
PCT Pub. Date: Dec. 4, 2014

(65) Prior Publication Data

US 2016/0115901 A1 Apr. 28, 2016

(30) Foreign Application Priority Data

May 31, 2013 (DE) ........................ 10 2013 009 161

(51) Int. Cl.
*F02F 3/00* (2006.01)
*B23P 15/10* (2006.01)
(Continued)

(52) U.S. Cl.
CPC *F02F 3/22* (2013.01); *F01P 3/08* (2013.01); *F02F 3/00* (2013.01); *F02F 3/02* (2013.01); *F02F 3/16* (2013.01); *F02F 3/20* (2013.01)

(58) Field of Classification Search
CPC ........ F02F 3/22; F02F 3/02; F02F 3/00; F02F 3/0015; F02F 3/16; F02F 3/18; F02F 3/20; F02F 5/00; F01P 3/08; F01P 3/10
(Continued)

(56) References Cited

U.S. PATENT DOCUMENTS 6,892,689 B2 5/2005 Bischofberger et al.
8,661,965 B2 3/2014 Scharp et al.
8,813,712 B2 8/2014 Bing et al.

FOREIGN PATENT DOCUMENTS

DE 91162 C 8/1971
DE 243530 C 12/1985
(Continued)

OTHER PUBLICATIONS

German Search Report for DE-10040486.
English abstract for DE-10040486.

*Primary Examiner* — Syed O Hasan
(74) *Attorney, Agent, or Firm* — Fishman Stewart PLLC

(57) ABSTRACT

A piston for an internal combustion engine may include a piston head and a piston skirt. The piston head may include a piston crown, an encircling fire land, an encircling ring belt having a plurality of ring grooves and an encircling cooling duct disposed radially inwards from the ring belt. The cooling duct may be open in an axial direction away from the fire land and may be at least partially closed via a closure element. The cooling duct may have a cooling duct base and a cooling duct ceiling. The closure element may be arranged on the piston head to define the cooling duct base in a position above a lowermost ring groove of the plurality of ring grooves.

20 Claims, 5 Drawing Sheets

(51) Int. Cl.

| | |
|---|---|
| ***F01P 1/04*** | (2006.01) |
| ***F02F 3/22*** | (2006.01) |
| ***F02F 3/16*** | (2006.01) |
| ***F02F 3/02*** | (2006.01) |
| ***F01P 3/08*** | (2006.01) |
| ***F02F 3/20*** | (2006.01) |

(58) Field of Classification Search
USPC ......................... 123/193.6, 41.39; 29/888.04
See application file for complete search history.

(56) References Cited

FOREIGN PATENT DOCUMENTS

| | | | |
|---|---|---|---|
| DE | 252638 | C | 9/1986 |
| DE | 10040486 | A1 | 3/2002 |
| DE | 10063568 | A1 | 7/2002 |
| DE | 102010056220 | A1 | 6/2012 |
| DE | 102011013113 | A1 | 9/2012 |
| WO | WO-2012083929 | A2 | 6/2012 |

PISTON FOR AN INTERNAL COMBUSTION ENGINE

CROSS-REFERENCE TO RELATED APPLICATIONS

This application claims priority to German Patent Application No. 10 2013 009 161.6, filed May 31, 2013, and International Patent Application No. PCT/DE2014/000264, filed May 28, 2014, both of which are hereby incorporated by reference in their entirety.

TECHNICAL FIELD

The present invention relates to a piston for an internal combustion engine, having a piston head and a piston skirt, the piston head having a piston crown, an encircling fire land, an encircling ring belt with ring grooves and, in the region of the ring belt, an encircling cooling duct which is open toward the bottom and is closed by way of a closure element, the cooling duct having a cooling duct base and a cooling duct ceiling.

BACKGROUND

In modern internal combustion engines, the pistons are subjected to ever higher temperature loading in the region of the piston skirt and of the combustion depression. Inadequate dissipation of heat from the piston head leads, during engine operation, to functional impairments of the piston, in particular to coking or oil carbon formation on the piston. This applies in particular to pistons composed of steel materials, as steel has a low coefficient of thermal conductivity and is thus a poor heat conductor.

SUMMARY

It is the object of the present invention to develop a piston of the generic type in such a way that optimized heat dissipation from the piston head is realized during engine operation.

The object is achieved by virtue of the fact that the closure element is arranged in the piston head in such a way that the cooling duct base is arranged above the lowermost ring groove.

In the prior art, the cooling duct extends in the axial direction generally as far as the height of the lowermost ring groove and below, in order to achieve sufficient cooling, in particular of steel pistons, during engine operation with the aid of a cooling duct which is as large as possible. However, on account of the cocktail shaker effect, the cooling oil moves back and forth between the cooling duct ceiling, that is to say a very hot region, and the cooling duct base, that is to say a comparatively cool region. On account of the considerably lower temperatures in the region of the cooling duct base, heat absorption from the piston head into the cooling oil no longer takes place there in practice. Furthermore, owing to the shallow heat gradient in the direction of the ring belt and piston skirt, only a relatively small amount of heat is dissipated from the cooling oil.

The piston according to the invention is distinguished from this in that the cooling duct is shortened in the axial direction in relation to the prior art. As a consequence, the cooling oil moves, in particular in the region of the cooling duct base, in closer proximity to the highly thermally loaded cooling duct base and therefore, overall, in hotter regions than in the prior art. Heat absorption from the hot regions of the piston head into the cooling oil therefore takes place in every phase of the piston movement. Considerably improved cooling of the piston head in relation to the prior art is realized in particular if the cooling oil quantity which is known from the prior art is retained and the cooling oil supply is set up in such a way that the cooling oil is exchanged rapidly during engine operation.

Advantageous developments will emerge from the subclaims.

The cooling duct base is preferably arranged at the level of the second ring groove, particularly preferably between the first ring groove and the second ring groove, in order to further increase the cooling performance by the cooling oil moving in even greater proximity to the hot piston crown during engine operation.

One advantageous development provides that the closure element is arranged in the piston head in such a way that an encircling annular gap is formed in the piston crown. This dispenses with the necessity of providing oil outlet openings.

A further preferred development provides that the height of the fire land is at most 9% of the nominal diameter of the piston head. In this way, positioning of the cooling duct in relation to the piston crown and the ring belt is realized which is particularly advantageous for the dissipation of heat.

In this case, the spacing between the piston crown and the cooling duct base may be between 11% and 17% of the nominal diameter of the piston head. In addition or instead, the height of the cooling duct may be 0.8 times to 1.7 times its width. Furthermore, as an alternative or in addition to this, the spacing between the piston crown and the cooling duct ceiling may be between 3% and 7% of the nominal diameter of the piston head. These dimension rules permit an optimized design and positioning of the cooling duct for all piston sizes.

The compression height may be, for example, between 38% and 45% of the nominal diameter of the piston head.

A further particularly preferred embodiment consists in that a combustion depression is formed in the piston head, and that the smallest wall thickness in the radial direction between the combustion depression and the cooling duct is between 2.5% and 4.5% of the nominal diameter of the piston head. An improved thermal transfer between the combustion depression and the cooling duct is achieved in this way.

The combustion depression may be provided, for example, with an undercut, in order to define the wall thickness between the combustion depression and the cooling duct.

In the case of a decoupled piston skirt, the closure element may be formed as a separate component which is fastened to the piston.

The piston according to the invention may be formed as a single-piece piston. The cooling duct is then made in a cast or forged blank in a manner known per se by way of machining. It is preferred, however, that the piston is assembled from at least two components which are connected non-releasably to one another. In particular, the piston according to the invention may have a piston main body and a piston ring element. In this case, the closure element may be formed both as a separate component which is fastened to the piston and as a component which is connected in one piece to the piston. In the latter case, the closure element may be connected in one piece either to the piston main body or to the piston ring element.

The present invention is suitable in particular for pistons composed of at least one steel material.

BRIEF DESCRIPTION OF THE DRAWINGS

In the following text, exemplary embodiments of the present invention will be explained in greater detail on the basis of the appended drawings, in which, in a diagrammatic illustration which is not true to scale.

DETAILED DESCRIPTION

Figure 1:
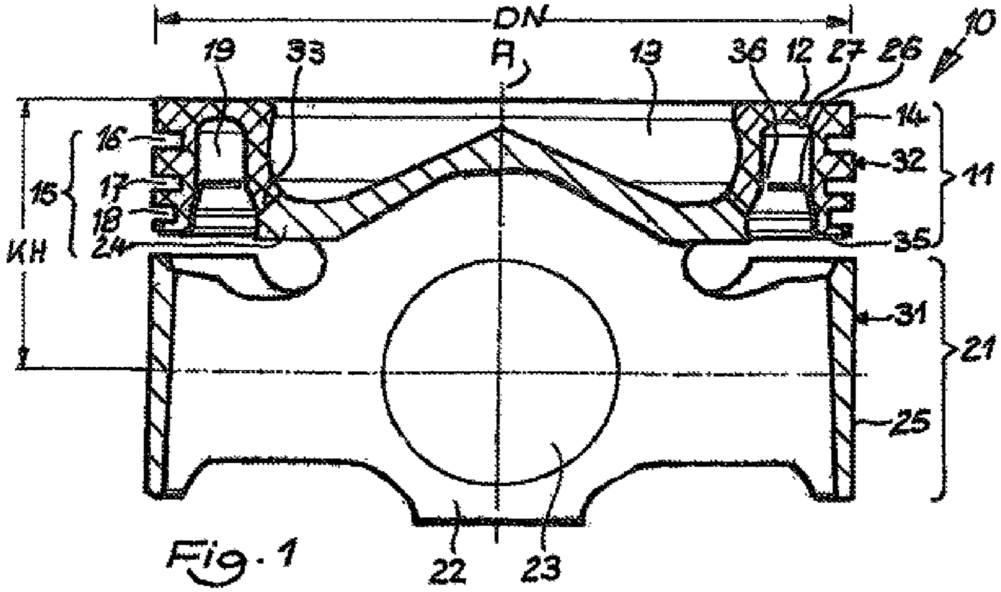
FIG. 1 shows a first exemplary embodiment of a piston according to the invention in section.
Figure 2:
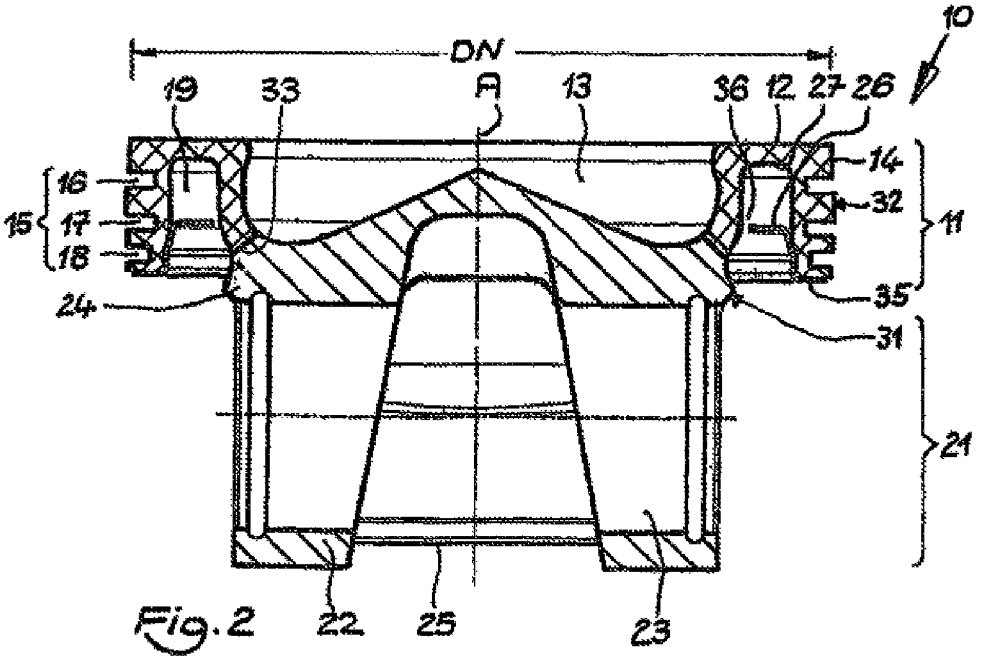
FIG. 2 shows the piston according to FIG. 1 in an illustration which has been rotated through 90°.

FIGS. 1 and 2 show a first exemplary embodiment of a piston 10 according to the invention. As is generally known, the piston 10 may be forged or cast as a single-piece blank, the cooling duct being formed into the blank by way of machining. In the exemplary embodiment, the piston 10 is assembled from a piston main body 31 and a piston ring element 32 which may be cast or forged in a manner known per se and are connected to one another via a welded seam 33, for example by means of electron beam welding or laser welding. In the exemplary embodiment, the welded seam 33 is arranged at the lowest point of the combustion depression at an acute angle with respect to the piston center axis A. In the exemplary embodiment, the piston 10 is produced from a steel material.

The piston 10 has a piston head 11 with a piston crown 12 which has a combustion depression 13, an encircling fire land 14 and an encircling ring belt 15 with ring grooves 16, 17, 18 for receiving piston rings (not shown). An encircling cooling duct 19 is provided at the level of the ring belt 15.

Furthermore, the piston 10 has a piston skirt 21 which is thermally decoupled from the piston head 11 and which has piston bosses 22 and boss bores 23 for receiving a piston pin (not shown). The piston bosses 22 are connected via boss attachments 24 to the underside of the piston head 11. The piston bosses 22 are connected to one another via running faces 25.

The cooling duct 19 is formed so as to be open toward the bottom and is closed by way of a separate closure element 35, a closure plate in the exemplary embodiment. The closure element 35 is fastened to the piston head 11 in a manner known per se below the ring belt 15 and extends in the direction of the combustion depression 13 in such a way that the annular free end of the closure element 35 forms an encircling annular gap 36 together with the outer wall of the combustion depression 13.

It is self-evidently possible for the annular gap 36 to be dispensed with. Instead, in a manner known per se, the cooling duct 19 may be completely closed off by the closure element 35, with inlet and outlet openings for cooling oil being provided in the closure element 35.

The closure element 35 is curved in the direction of the piston crown 12 in such a way that a cooling duct base 26 is formed which lies approximately at the level of the second ring groove 17 in the exemplary embodiment. The cooling duct base 26 may also be arranged between the first ring groove 16 and the second ring groove 17.

Furthermore, the cooling duct 19 has a cooling duct ceiling 27.

In the exemplary embodiment, the compression height KH is between 38% and 45% of the nominal diameter DN of the piston head 11.

Figure 3:
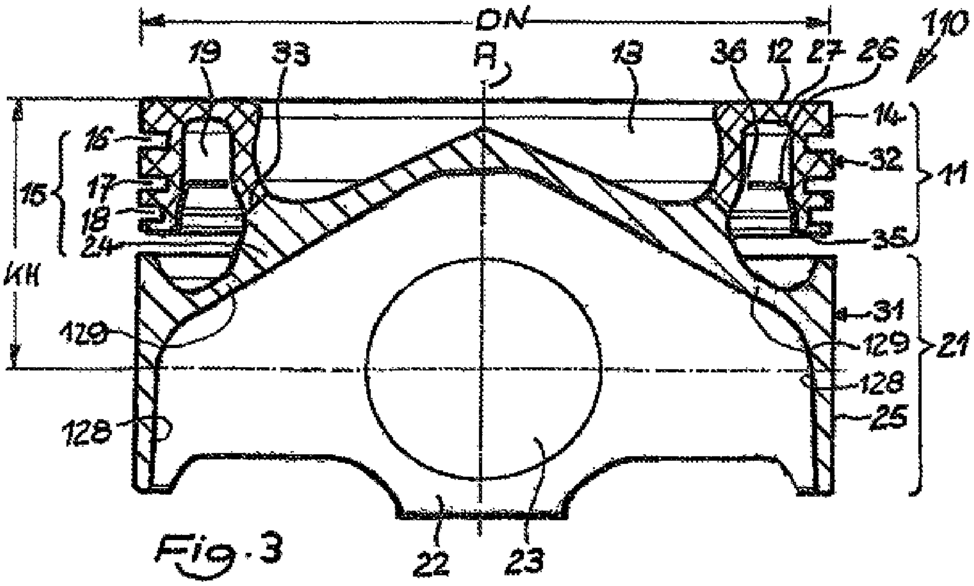
FIG. 3 shows a further exemplary embodiment of a piston according to the invention in section.
Figure 4:
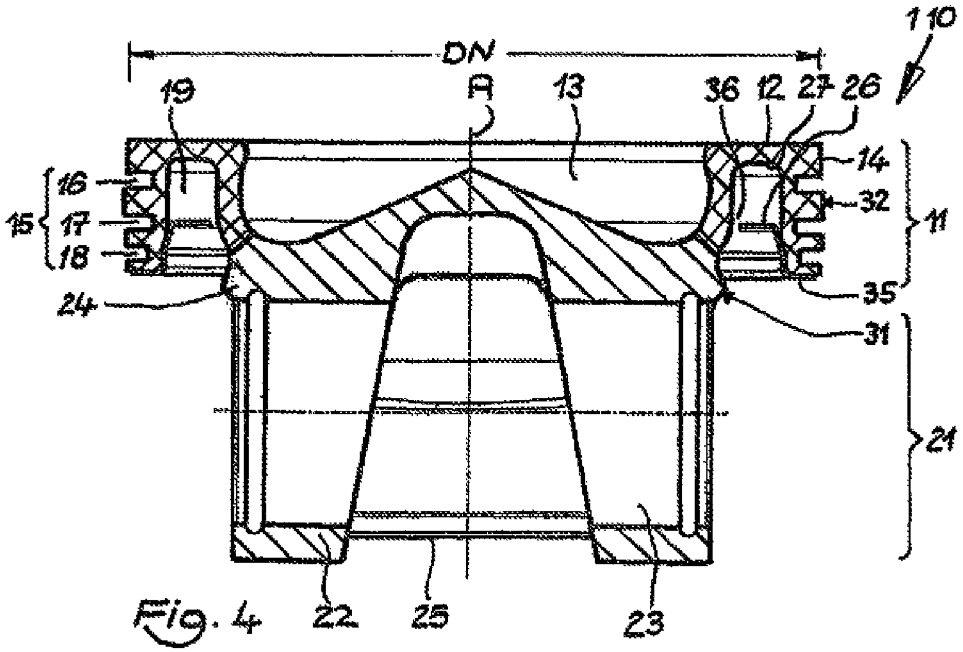
FIG. 4 shows the piston according to FIG. 3 in an illustration which has been rotated through 90°.

FIGS. 3 and 4 show a further exemplary embodiment of a piston 110 according to the invention. The piston 110 is constructed in a similar way to the piston 10 according to FIGS. 1 and 2. Structural elements which correspond are therefore provided with the same designations, and reference is made in this regard to the description with respect to FIGS. 1 and 2.

The main difference between the piston according to FIGS. 3 and 4 and the piston according to FIGS. 1 and 2 consists in the fact that the inner faces 128 of the running faces 25 of the piston 110 are connected via a connecting wall 129 to the underside of the piston head 11.

Figure 5:
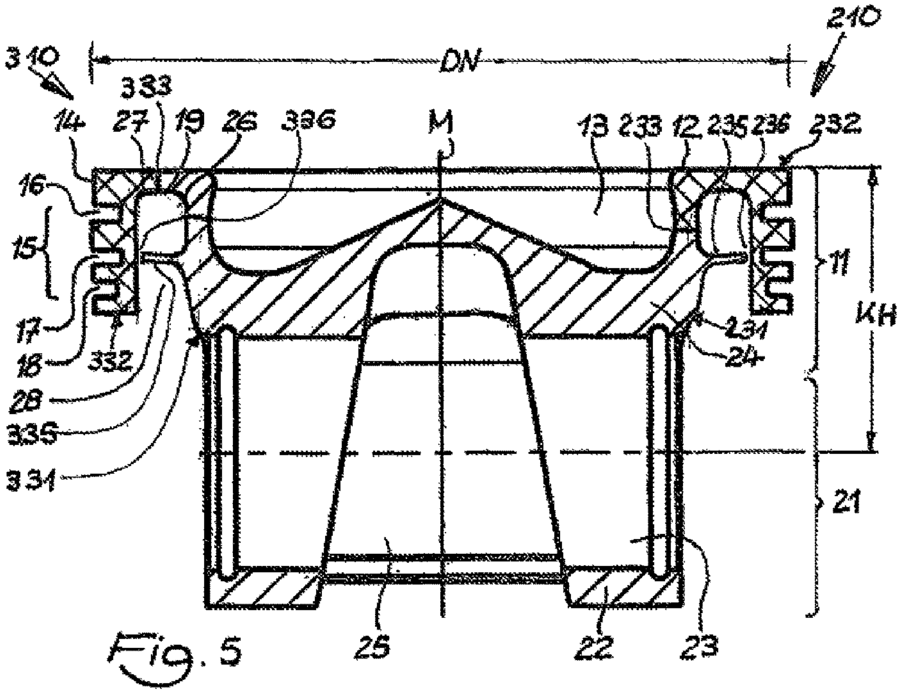
FIG. 5 shows an overall illustration of two further exemplary embodiments in section.

FIG. 5 shows, in an illustration as per FIG. 2, an overall view of two further exemplary embodiments of pistons 210, 310 according to the invention. The illustrations of the respective exemplary embodiments are separated by the center line M.

The pistons 210, 310 are constructed in a similar way to the piston 10 according to FIGS. 1 and 2. Structural elements which correspond are therefore provided with the same designations, and reference is made in this regard to the description with respect to FIGS. 1 and 2.

The main differences consist firstly in the design of the piston main body 231, 331 and of the piston ring element 132, 332 and secondly in the fact that the pistons 210, 310 have a closure element 235, 335 of different design in comparison with the piston 10 according to FIGS. 1 and 2.

Both exemplary embodiments have in each case one closure element 235, 335 in the form of an encircling flange which is connected in one piece to the piston main body 231, 331. Each closure element 235, 335 extends in the direction of the ring belt 15 in such a way that the free end of each closure element 235, 335 forms an encircling annular gap 236, 336 together with the inner wall of the ring belt 15.

The piston 210 (illustration to the right of the center line M) is composed of a piston main body 231 and a piston ring element 232. In the exemplary embodiment, the piston ring element 232 comprises a part of the depression wall and the depression edge of the of the combustion depression 13 and also the piston crown 12, the fire land 14 and the ring belt 15. The piston ring element 232 may be connected to the piston main body 131 in particular by way of a welding process, for example electron beam welding, laser welding or friction welding, wherein the welded seam 233 is arranged in the in the depression wall of the combustion depression 13.

Figure 6:
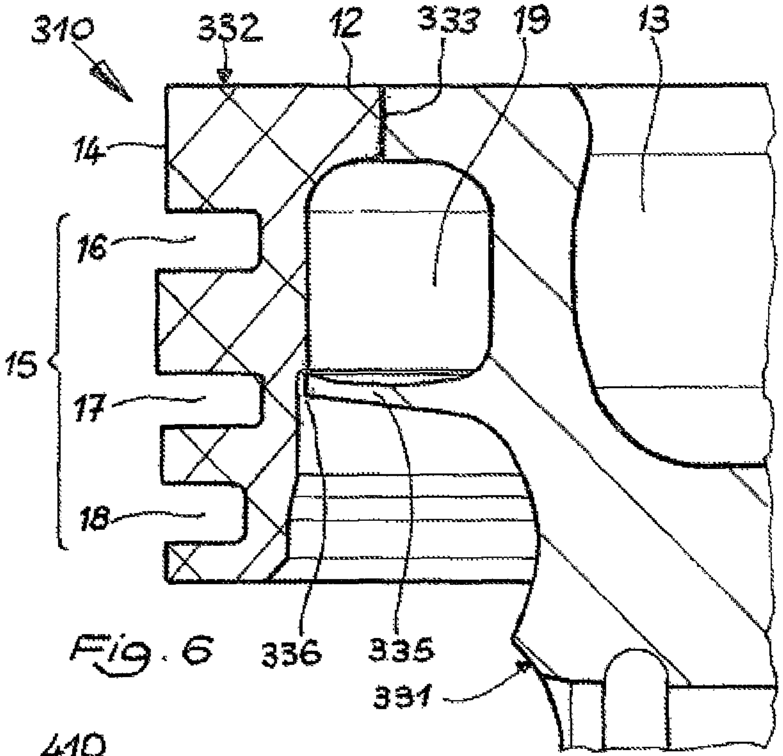
FIG. 6 shows an enlarged partial illustration of the piston as per FIG. 5, left-hand side, in section.

The piston 310 (illustration to the left of the center line M) (cf. also the enlarged partial illustration in FIG. 6) is composed of a piston main body 331 and a piston ring element 332. In the exemplary embodiment, the piston ring element 332 comprises a part of the piston crown 12, the fire land 14 and the ring belt 15. The piston ring element 332 may be connected to the piston main body 331 in particular by way of a welding process, for example electron beam welding or laser welding, wherein the welded seam 333 is arranged in the piston crown.

Figure 7:
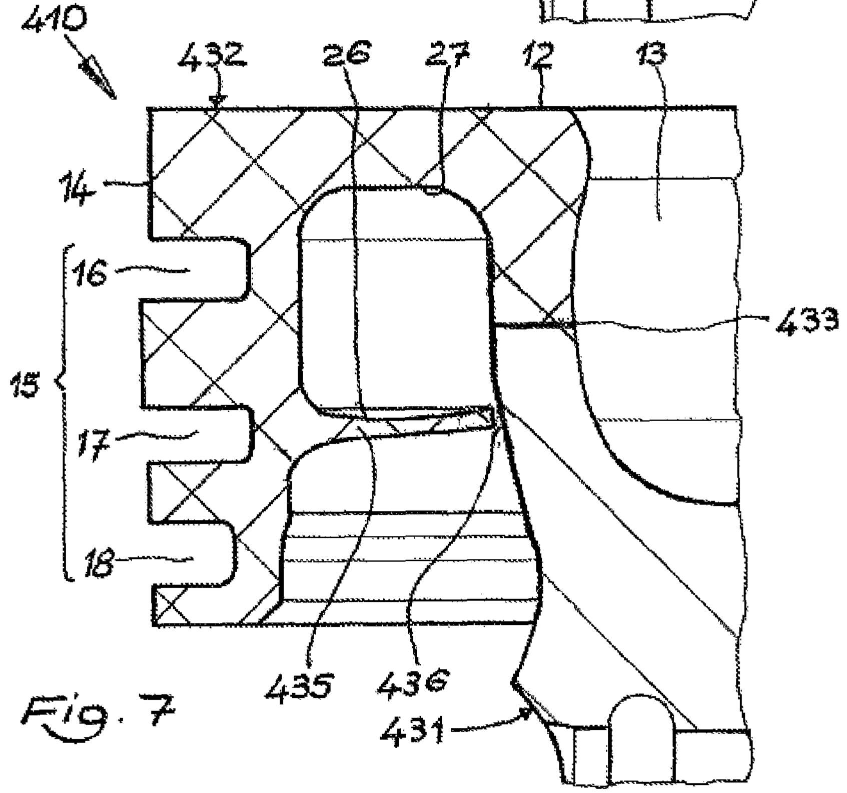
FIG. 7 shows an enlarged partial illustration of a further exemplary embodiment in section.

FIG. 7 shows an enlarged partial illustration of a further exemplary embodiment of a piston 410. The piston 410 is constructed in a similar way to the piston 210 according to FIG. 5, right-hand side. Structural elements which correspond are therefore provided with the same designations, and reference is made in this regard to the description with respect to FIG. 5.

The main difference consists in that the closure element 435 is formed in the manner of an encircling flange which is connected in one piece to the piston ring element 432. The closure element 435 extends in the direction of the combustion depression 13 in such a way that the free end of the closure element 435 forms an encircling annular gap 436 together with the outer wall of the combustion depression 13.

The piston 410 is likewise composed of a piston main body 431 and a piston ring element 432. In the exemplary embodiment, the piston ring element 432 comprises a part of the depression wall and the depression edge of the of the combustion depression 13 and also the piston crown 12, the fire land 14 and the ring belt 15. In the exemplary embodiment, the piston ring element 432 is connected to the piston main body 431 by way of friction welding, wherein the welded seam 433 is arranged in the in the depression wall of the combustion depression 13.

Figure 8:
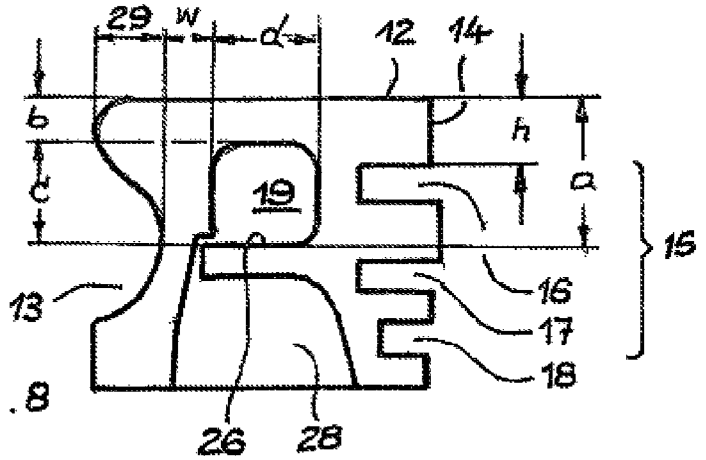
FIG. 8 shows an enlarged partial illustration of the exemplary embodiment as per FIG. 7.
Figure 9A:
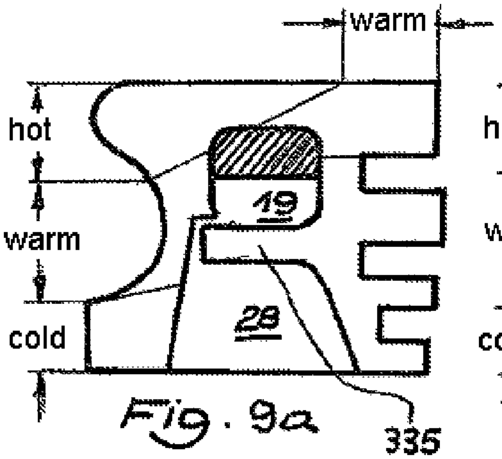
FIGS. 9*a*, 9*b* show a diagrammatic illustration of the cooling oil movement in a piston according to the present invention.
Figure 9B:
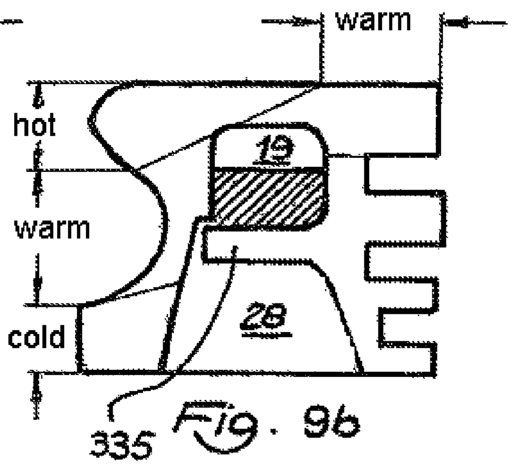

FIG. 8 shows, by way of example and in an enlarged partial illustration, the cooling duct 19 with cooling duct base 26 and cooling duct ceiling 27 and also the piston crown 12, a part of the combustion depression 13, the fire land 14, the ring belt 15 with the ring grooves 16, 17, 18, and also the closure element 435 of the piston 410 according to the invention as per FIG. 7.

The combustion depression 13 is provided with an undercut 29, in order to define the wall thickness between the combustion depression 13 and the cooling duct 19 (see below in this regard).

It is preferred that the height h of the fire land 14 is at most 9% of the nominal diameter DN of the piston head 11 (see FIGS. 1 and 2). In this way, positioning of the cooling duct 19 in relation to the piston crown 12 and the ring belt 15 is realized which is particularly advantageous for the dissipation of heat.

On the basis of this dimension rule for the fire land 14, it is preferred that the spacing a between the piston crown 12 and the cooling duct base 26 is between 11% and 17% of the nominal diameter DN of the piston head 11 (see FIGS. 1 and 2). In this way, the cooling duct 19 is positioned in optimum proximity to the hot piston crown 12 and in an optimum position relative to the relatively cool ring grooves 16, 17, 18.

Moreover, it is preferred that the height c of the cooling duct 19 is 0.8 times to 1.7 times its width d. Said dimension rule yields an optimum volume of the cooling duct 19 and an optimum orientation relative to the hot combustion depression 13, in particular relative to the depression edge, and relative to the hot piston crown 12 and relative to the relatively cool ring grooves 16, 17, 18.

Finally, it is preferred that the spacing b between the piston crown 12 and the cooling duct ceiling 27 is between 3% and 7% of the nominal diameter DN of the piston head 11 (cf. FIGS. 1 and 2). Said dimension rule also yields optimum positioning of the cooling duct 19 in relation to the hot piston crown 12.

Ultimately, it is preferred that the smallest wall thickness w in the radial direction between the combustion depression 13 and the cooling duct 19 is between 2.5% and 4.5% of the nominal diameter DN of the piston head 11. An improved thermal transfer between the combustion depression 13 and the cooling duct 19 is achieved in this way.

Figure 10A:
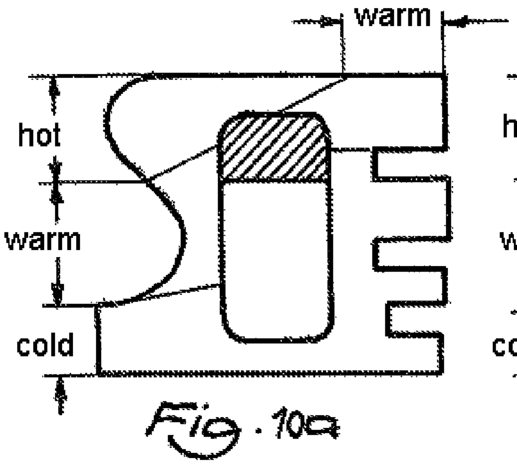
FIGS. 10*a*, 10*b* show a diagrammatic illustration of the cooling oil movement in a piston according to the prior art.
Figure 10B:
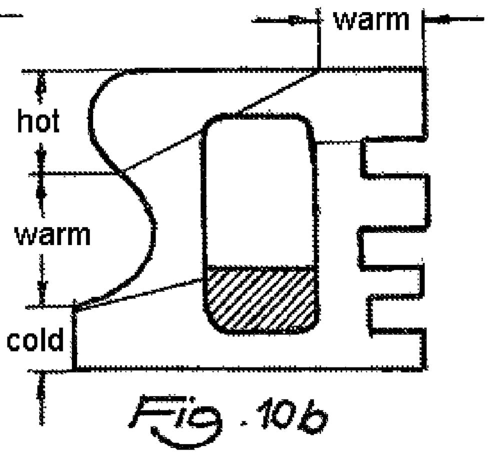

FIGS. 9*a* and 9*b* and 10*a* and 10*b* schematically show the cooling oil movement during engine operation and the temperature zones in the region of the combustion depression, of the piston crown, of the cooling duct and of the ring grooves both for a piston according to the invention (FIGS. 9*a* and 9*b*) and for a piston according to the prior art (FIGS. 10*a* and 10*b*).

In FIGS. 9*a*, 9*b*, 10*a*, 10*b*, three heat zones are schematically indicated, namely "hot", "warm" and "cool". The relative temperature differences in the individual piston regions are intended to be illustrated in this way.

According to the present invention (FIGS. 9*a* and 9*b*), the cooling duct is shortened in the axial direction in relation to the prior art. As a consequence, the cooling oil moves almost exclusively along the "hot" regions of the piston crown and of the combustion depression. An absorption of heat from the "hot" regions of the piston head into the cooling oil therefore takes place in every phase of the piston movement. The cooling oil quantity known from the prior art should be retained and the engine management should be set up in such a way that the cooling oil is exchanged rapidly during engine operation.

In the prior art (FIGS. 10*a* and 10*b*), the cooling duct extends in the axial direction generally as far as the level of the lowermost ring groove and below, in order to achieve sufficient cooling during engine operation with the aid of a cooling duct which is as large as possible. On account of the cocktail shaker effect, the cooling oil moves between a "hot" region, namely the piston crown and the depression edge of the combustion depression, and a "cool" region, namely the cooling duct base. On account of the considerably lower temperatures in the region of the cooling duct base, in practice heat absorption from the piston head into the cooling oil no longer takes place there.

As a consequence, considerably improved cooling of the piston head in relation to the prior art is realized in the case of the piston according to the invention.

The invention claimed is:

1. A piston for an internal combustion engine, comprising: a piston head and a piston skirt together defining a reciprocating axis; the piston head including a piston crown, an encircling fire land, an encircling ring belt including a plurality of ring grooves, and an encircling cooling duct disposed radially inwards from the encircling ring belt with respect to the reciprocating axis, the encircling cooling duct being open in an axial direction away from the encircling fire land and at least partially closed via a closure element, the encircling cooling duct having a cooling duct base and a cooling duct ceiling, wherein the closure element is arranged in the piston head to define the cooling duct base in a position above a lowermost ring groove of the plurality of ring grooves; wherein an axial height of the encircling fire land with respect to the reciprocating axis is 9% or less than a nominal diameter of the piston head; and wherein an axial extent between the piston crown and the cooling duct base with respect to the reciprocating axis is between 11% and 17% of the nominal diameter of the piston head.

2. The piston as claimed in claim 1, wherein the cooling duct base via the closure element is arranged at a level of an intermediate ring groove of the plurality of ring grooves.

3. The piston as claimed in claim 1, wherein the closure element is configured on the piston head to define an encircling annular gap disposed at the cooling duct base.

4. The piston as claimed in claim 1, wherein the encircling cooling duct defines a height in an axial direction and a width in a radial direction with respect to the reciprocating axis, and wherein the height of the encircling cooling duct is 0.8 times to 1.7 times the width of the cooling duct.

5. The piston as claimed in claim 1, wherein an axial extent between the piston crown and the cooling duct ceiling with respect to the reciprocating axis is between 3% and 7% of the nominal diameter of the piston head.

6. The piston as claimed in claim 1, wherein the piston head further includes a combustion depression, and wherein the piston head defines a wall thickness in a radial direction with respect to the reciprocating axis between the combustion depression and the encircling cooling duct ranging from 2.5% to 4.5% of the nominal diameter of the piston head.

7. The piston as claimed in claim 6, wherein the combustion depression includes an undercut in the radial direction.

8. The piston as claimed in claim 1, wherein the closure element is configured as a separate component from the piston head.

9. The piston as claimed in claim 1, wherein the piston head and the piston skirt are composed of at least two components connected non-releasably to one another.

10. The piston as claimed in claim 9, wherein the at least two components include a piston main body and a piston ring element.

11. The piston as claimed in claim 10, wherein the closure element is configured as one piece with the piston main body.

12. The piston as claimed in claim 10, wherein the closure element is configured as one piece with the piston ring element.

13. The piston as claimed in claim 1, wherein at least one of the piston head and the piston skirt is composed of a steel material.

14. A piston for an internal combustion engine, comprising: a piston head and a piston skirt together defining a reciprocating axis; the piston head including a piston crown, a circumferential fire land, a circumferential ring belt including a plurality of ring grooves, and an annular cooling duct disposed radially inwards from the circumferential ring belt with respect to the reciprocating axis, the annular cooling duct configured open in an axial direction away from the circumferential fire land; a closure element at least partially closing the annular cooling duct and defining a cooling duct base positioned away from the circumferential fire land in relation to a cooling duct ceiling, the closure element disposed on the piston head to position the cooling duct base above a lowermost ring groove of the plurality of ring grooves; wherein the annular cooling duct defines a height in the axial direction of the reciprocating axis and a width in a radial direction of the reciprocating axis, and the height of the annular cooling duct is from 0.8 times to 1.7 times the width of the annular cooling duct; and wherein an axial extent between the piston crown and the cooling duct ceiling with respect to the reciprocating axis is from 3% to 7% of a nominal diameter of the piston head.

15. The piston as claimed in claim 14, wherein the closure element extends in the radial direction of the reciprocating axis away from the circumferential ring belt and provides an annular gap at the cooling duct base.

16. A piston for an internal combustion engine, comprising: a piston body having a center axis and a piston ring element coupled to the piston body, the piston body and the piston ring element together defining a piston head; the piston head including a piston crown, a circumferential fire land, a circumferential ring belt including a plurality of ring grooves, and an annular cooling duct disposed radially inwards from the circumferential ring belt with respect to the center axis, the annular cooling duct configured open in an axial direction away from the circumferential fire land; a closure element at least partially closing the annular cooling duct and defining a cooling duct base positioned away from the circumferential fire land in relation to a cooling duct ceiling, the closure element connected integrally with the piston body and arranged on the piston head to provide an annular gap at the cooling duct base; and wherein the closure element positions the cooling duct base at a level between a first ring groove and a second ring groove of the plurality of ring grooves.

17. The piston as claimed in claim 16, wherein the second ring groove is disposed between the first ring groove and a third ring groove of the plurality of ring grooves, and wherein the first ring groove is disposed proximal to the circumferential fire land in relation to the third ring groove.

18. The piston as claimed in claim 16, wherein the piston head further includes a combustion depression disposed radially inwards of the annular cooling duct with respect to the center axis, and wherein the closure element extends in a radial direction of the center axis from a radially outer wall of the combustion depression towards the circumferential ring belt.

19. The piston as claimed in claim 18, wherein the piston body and the piston ring element are coupled to one another via a weld seam disposed in the outer wall of the combustion depression, the closure element arranged integrally connected to a first part of the outer wall of the combustion depression defined by the piston body, and wherein the piston ring element defines a second part of the outer wall of the combustion depression, the piston crown, the fire land, and the circumferential ring belt.

20. The piston as claimed in claim 16, wherein the piston body includes a piston skirt, and wherein a compression height defined by the piston head together with the piston skirt is from 38% to 45% of a nominal diameter of the piston head.

* * * * *